United States Patent
Stevens et al.

(10) Patent No.: US 6,377,725 B1
(45) Date of Patent: Apr. 23, 2002

(54) OPTICAL WAVELENGTH DIVISION MULTIPLEXED INTERCONNECT SYSTEM PROVIDING AUTONOMOUS INFORMATION SELECTION AND PRIORITIZATION

(75) Inventors: Rick C. Stevens, Apple Valley; James Vincent Hedin, Eagan, both of MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/546,436

(22) Filed: Apr. 10, 2000

(51) Int. Cl.[7] .................................................. G02B 6/28
(52) U.S. Cl. ...................... 385/24; 359/124; 359/127; 359/128
(58) Field of Search ................................ 359/124, 127, 359/128; 385/24

(56) References Cited

U.S. PATENT DOCUMENTS 5,739,935 A * 4/1998 Sabella
5,907,551 A * 5/1999 Nishio et al.

* cited by examiner

*Primary Examiner*—Hung N. Ngo
(74) *Attorney, Agent, or Firm*—Patrick M. Hogan; Glenn W. Bowen

(57) ABSTRACT

An optical-interconnect arrangement is disclosed in various embodiments. In one embodiment, an optical-interconnect node includes a an optical-link section and a processor-link section. The optical-link section includes an optical combiner and an optical splitter. The combiner combines an optical signal of a local node with optical signals from other connected nodes, and the combined signals are carried on a common waveguide. Each node has an optical splitter that splits the optical signals for local processing. The processor-link section includes a demultiplexer and a transmitter. The optical signals from a splitter are input to a demultiplexer, which separates and converts the optical signals to respective electrical signals. The transmitter converts a local electrical signal to an optical signal having a wavelength associated with the node.

19 Claims, 3 Drawing Sheets

OPTICAL WAVELENGTH DIVISION MULTIPLEXED INTERCONNECT SYSTEM PROVIDING AUTONOMOUS INFORMATION SELECTION AND PRIORITIZATION

FIELD OF THE INVENTION

The present invention generally relates to optical interconnects, and more particularly to an optical interconnect between processor nodes.

BACKGROUND

Optical interconnects for various processor arrangements have become popular in part because of high bandwidth and lost cost. However, the particular arrangement by which the processors are interconnected with optical fiber may create a single point of failure as well as create bandwidth allocation challenges.

For example, an optical interconnect is used in some applications to connect a plurality of processors for inter-processor communication. The optical fibers are coupled to the processors and interconnected at a centralized switch. The centralized switch receives from the processors information packets in the form of optical signals. The switch converts the optical signals to electrical signals, decodes the packet header to determine the destination processors, converts the electrical signals back to optical signals, and routes the optical signals to the proper destination processors. Because all the optical fibers are routed to the single central switch, this interconnect is prone to a single point of failure. Furthermore, if the central switch receives at the same time multiple packets that are addressed to the same processor, a prioritization scheme must be exercised to route the packets. The single point of failure and bandwidth limitations must be considered in implementing this interconnect in a particular application.

An interconnect system and a method that addresses the aforementioned problems, as well as other related problems, are therefore desirable.

SUMMARY OF THE INVENTION

An optical-interconnect node, arrangement, and method are disclosed in various embodiments of the invention. In one embodiment, an optical-interconnect node includes a an optical-link section and a processor-link section. The optical-link section includes an optical combiner and an optical splitter. The combiner combines an optical signal of a local node with optical signals from other connected nodes, and the combined signals are carried on a common waveguide. Each node has an optical splitter that splits the optical signals for local processing. The processor-link section includes a demultiplexer and a transmitter. The optical signals from a splitter are input to a demultiplexer, which separates and converts the optical signals to respective electrical signals. The transmitter converts a local electrical signal to an optical signal having a wavelength associated with the node.

In a system embodiment, a plurality of nodes are coupled via the optical combiners and optical splitters.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments, an optical interconnect arrangement is provided in which optical signals from the processors connected to the interconnect are simultaneously carried on a single optical cable. Each of the processors has associated therewith a dedicated wavelength for transmitting signals. Electrical signals from the processors are converted into optical signals and input to respective combiners. The combiners are serially connected to carry the optical signals from the processors over an optical cable. A series of optical splitters are connected to the output of the last combiner, wherein each splitter splits the optical signals for input to a wavelength division multiplexer (WDM) demultiplexer, thereafter conversion to electrical signals, and then input to one of the processors. Thus, a processor simultaneously receives all the optical signals from the other processors.

Figure 1:
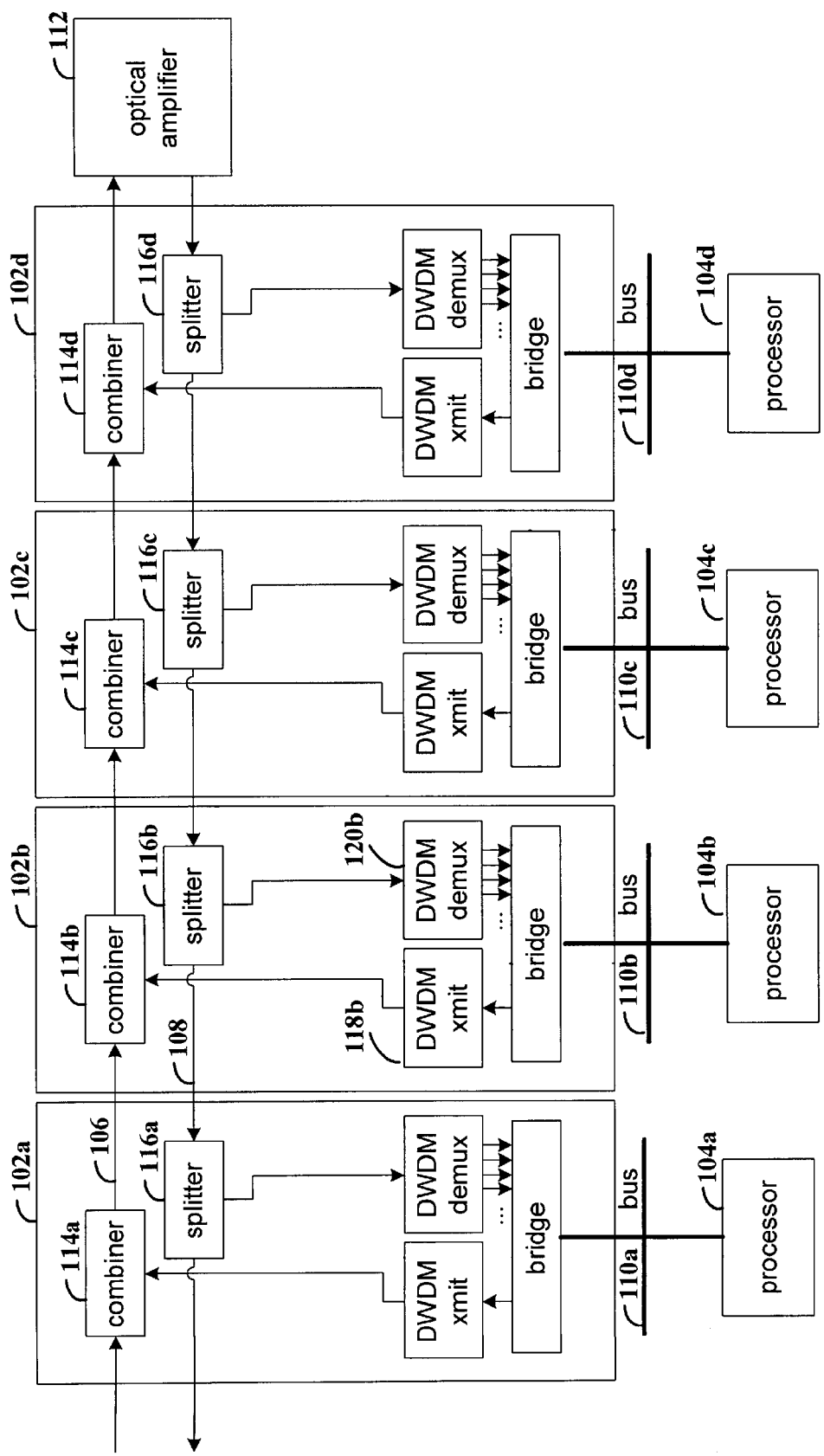
FIG. 1 is a block diagram of an optical interconnect arrangement in accordance with one embodiment of the invention.

FIG. 1 is a block diagram of an optical interconnect arrangement in accordance with one embodiment of the invention. The arrangement includes optical links 102a–d which are coupled to processors 104a–d, respectively. Links 102a–d are serially coupled via optical cables, as illustrated, for example, by lines 106 and 108. Each link is coupled to a respective one of processors 104a–d via a respective bus. For example, link 102a is coupled to processor 104a via bus 110a. While the illustrated embodiment includes a bus connection, it will be appreciated that a point-to-point or another conventional interface could be used between a processor and an optical link, depending on particular application requirements. Links 102a–d are coupled to buses 110a–d, respectively.

While the illustrated arrangement includes four links 102a–d, more or fewer links can be connected depending on the desired number of processors. The arrangement also includes optical amplifier 112, which may be needed for larger networks or may be unnecessary for small networks. Where an amplifier is unnecessary, the output port of the combiner is connected directly to the input port of the splitter.

Each of the links includes a link-connect section and a processor-connect section. The link-connect section includes an optical combiner and an optical splitter. For example, link 102a includes combiner 114a and splitter 116a. The combiner combines input optical signals from another optical link and output optical signals from the local processor-connect section. For example, combiner 114b of link 102b receives and combines optical signals from combiner 114a of link 102a with signals from DWDM (dense wavelength division multiplexer) transmit element 118b.

The splitter receives optical signals from the splitter of another optical link, and transmits the optical signals to the local processor-connect section and to the next optical link in the chain. For example, splitter 116b receives optical signals from splitter 116c of link 102c and transmits the optical signals to local DWDM demultiplexer ("demux") element 120b and to splitter 116a of the next optical link 102a.

The output port of the last combiner in the chain of combiners is coupled to the input port of the first splitter in the chain of splitters. For example, combiner 114d is coupled to splitter 116d. As set forth above, optical amplifier 112 may be need to boost the optical signals for larger networks. Additional optical links can be connected to the interconnect at the open end, for example, at link 102a. The optical interconnect requires only one combiner-to-splitter coupling. That is, optical link 102d at the one end of the interconnect has a combiner-to-splitter coupling, but optical link 102a (or another link for larger interconnects) does not have a combiner-to-splitter coupling.

The processor-connect section includes three major components: a transmit element, a receive element, and a bridge. The transmit element is embodied in a DWDM transmit element (118b, for example), and the receive element is embodied in DWDM demux (120b, for example). An input port of the DWDM transmit element is coupled to the bridge, wherein the DWDM transmit element converts electrical signals to optical signals for input to a combiner. The DWDM demux element has an input port coupled to a splitter and output ports coupled to the bridge and converts optical signals to electrical signals (corresponding to those output from the various processors). The bridge controls the flow of signals received from the various processors on the interconnect to the local bus and signals from the local bus to be transmitted over the interconnect. The decentralized processor-connect sections allows each processor arrangement to establish a prioritization scheme, which may be the same or different from that employed by the other processor arrangements, for processing data from the other processors.

In one embodiment, the interconnect arrangement is implemented with commercially available parts. For example, the combiner is implemented with a single mode fiber optic coupler from ADC (part #WBY10131510ASRPAFC). The splitter is also implemented with a single mode fiber optic coupler (with the connections reversed relative to the combiner). The DWDM transmit element is implemented with a Nortel MDTL162W DWDM transmitter, and the DWDM demux is implemented with a Nortel DMX4-113 DWDM demultiplexer. Those skilled in the art will recognize suitable alternatives.

Figure 2:
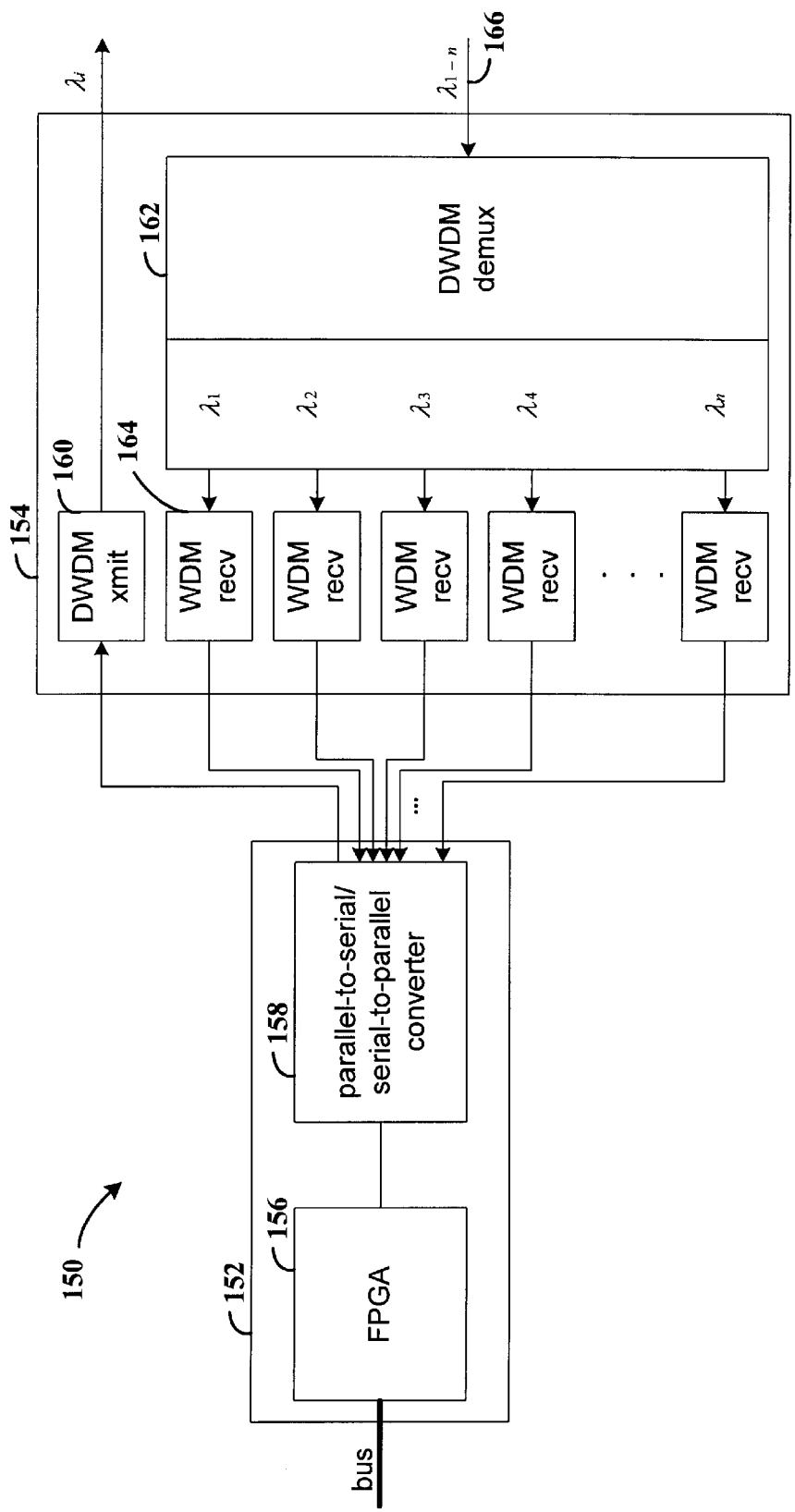
FIG. 2 is a block diagram of a processor-connect section of an optical link in accordance with one embodiment of the invention.

FIG. 2 is a block diagram of a processor-connect section 150 of an optical link in accordance with one embodiment of the invention. The processor-connect section includes bridge 152 and board 154, which hosts the optical-to-electrical and electrical-to-optical conversion circuitry.

Bridge 152 includes FPGA 156 and converter 158. The logic that implements the interface to the local bus is implemented on the FPGA. In one embodiment the FPGA is a Virtex FPGA from Xilinx. It will be appreciated, however, that a different type of programmable logic device or an ASIC could be used to implement the bus interface. Converter 158 performs parallel-to-serial data conversions for data from the bus to be transmitted on the optical interconnect. Converter 158 also converts serial data received from the optical interconnect to parallel data to be transmitted on the bus. An AMCC S2064A quad serial backplane device is used to implement converter 158 in one embodiment. Those skilled in the art will recognize suitable alternatives for implementing the converter.

Board 154 hosts DWDM transmit element 160, DWDM demux element 162, and a plurality of WDM receivers 164. DWDM transmit element 160 is coupled to the serial output port of converter 158 and converts the electrical signal from the serial output of the converter to an optical signal. The optical signal is one which is unique (frequency or wavelength) relative to the optical signals for other processors on the interconnect.

Each node has a transmitter that generates output of a different optical wavelength. This is accomplished using the same basic transmitter design in each node, wherein each transmitter has a different setting for the Thermo-Electric (TE) cooler, which is used to maintain the temperature of the transmitting laser device. The optical wavelength of the laser emission is directly related to the temperature of the device.

DWDM demux element 162 demultiplexes optical signals of wavelength $\lambda_{1-n}$ which are input on an optical fiber as represented by line 166. The demultiplexed optical signals are then provided as input signals to respective WDM receivers 164. Each of the broadband receivers converts the corresponding optical wavelength input signal to an electrical signal, which is provided as input to converter 158.

Figure 3:
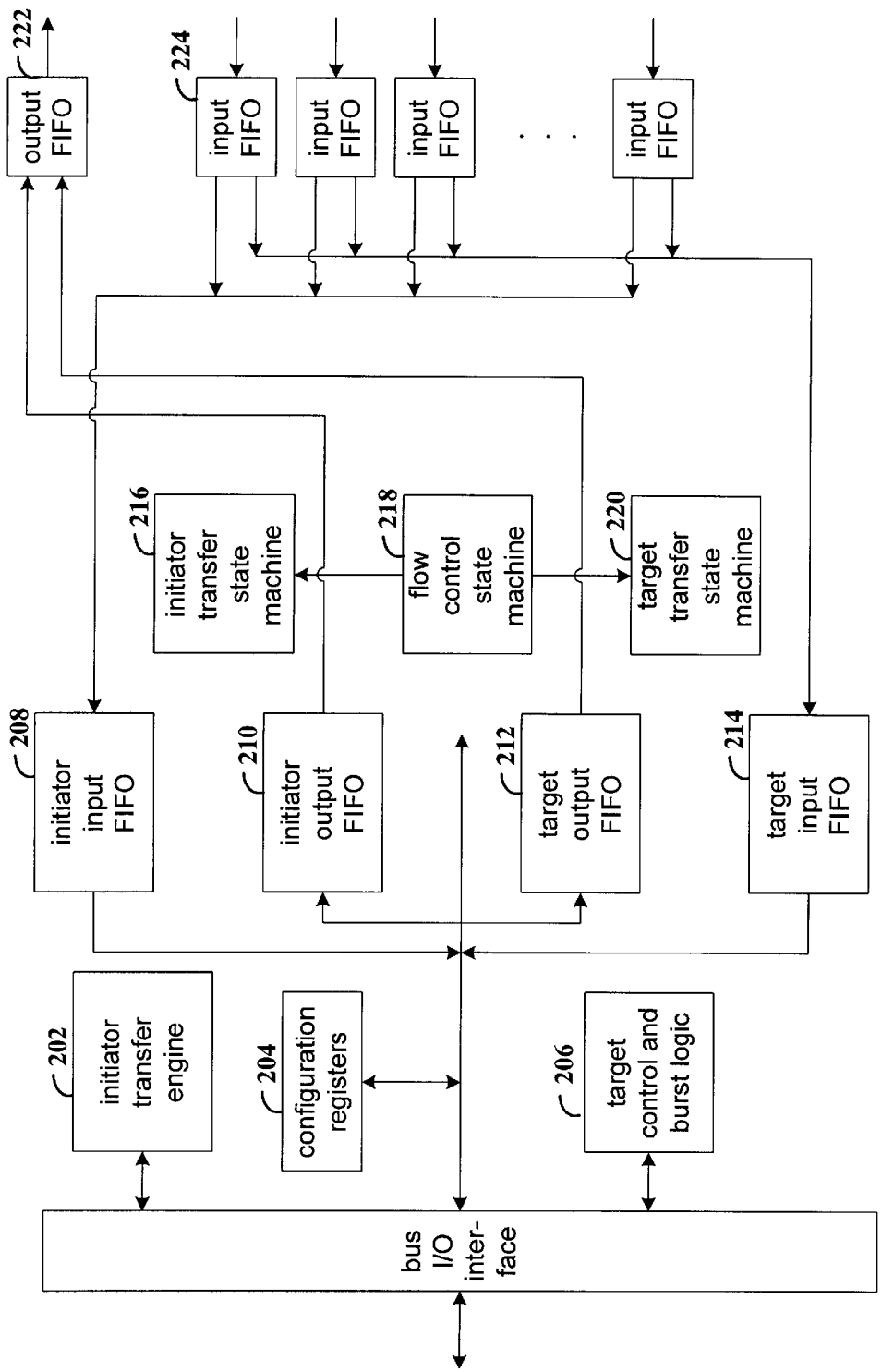
FIG. 3 is a functional block diagram of selected functionality implemented by a bridge.

FIG. 3 is a functional block diagram of functionality implemented by bridge 152. The lines in the figure represent data and control lines, and the functionality shown in FIG. 3 is suitable for interfacing with a PCI bus, in accordance with one embodiment of the invention. Thus, the components dealing with PCI functions can be implemented using commercially available logic cores, such as those available from Xilinx. In other embodiments, a bridge for a VME bus, a CPCI bus or other conventional bus could be implemented. In PCI terminology, "initiator" refers to the device on the PCI bus that initiates a data transfer function, and "target" is the device to which the function is directed. Generally the functions include reading and writing data.

Initiator FIFOs 208 and 210 are used when the bridge initiates a transfer of data already received from the optical interconnect and initiates a transfer of data between the local processor (104a of FIG. 1, for example) and the optical interconnect. Target FIFOs 212 and 214 are used when the local processor initiates a transfer of data between itself and the optical interconnect.

Initiator input FIFO 208 and target input FIFO 214 are coupled to the input FIFOs (224) that are associated with the different channels. Channels in this context refers to the wavelengths of optical signals used in the interconnect. Input FIFOs, such as input FIFO 224, receive data transmitted via the interconnect, and each input FIFO is coupled to a parallel output port of converter 158 (FIG. 2) and stores the data received from the various optical channels. Note that there are respective input FIFOs for the different channels supported by the interconnect. For example, there are n input FIFOs for wavelengths $\lambda_{1-n}$, respectively.

Output FIFO 222 temporarily stores data to be transmitted via the interconnect. Only one output FIFO is used in each of the optical links because each processor has associated therewith a dedicated wavelength, $\lambda_i$.

The remaining logic is directed specifically to interfacing with a PCI bus. To avoid clutter in the diagram, the control lines that connect the various state machines and FIFOs are not shown. Flow control state machine 218 controls initiator transfer state machine 216 and target transfer state machine 220. This prevents the initiator and the target from simultaneously attempting to use the same channel. Data received from the optical interconnect in the input FIFO has first priority for that channel.

The initiator section (202, 208, 210, and 216) functions independent of the target section (206, 212, 214, and 220). This allows data to be transferred simultaneously on two different channels. The initiator and target sections must share time on the local processor bus along with other devices (not shown) connected to the bus. Therefore, a local processor (e.g., 104a) may read or write data to a remote processor (e.g., 104c) on one optical channel while a remote processor (e.g., 104b) may read or write data to the local processor (104a) on a different optical channel concurrently.

Target control and burst logic element 206 controls the movement of data between the local processor bus and target FIFOs 212 and 214 for transactions started by the local processor. Initiator transfer engine 202 controls the movement of data between the local processor and initiator FIFOs 208 and 210 for transfers started by a remote processor.

Initiator transfer state machine 216 controls the movement of data between initiator FIFOs 208 and 210 and input and output FIFOs 224 and 222 for transactions started by a remote processor. Target transfer state machine 220 controls movement of data between target FIFOs 212 and 214 and input and output FIFOs 224 and 222 for transactions started by the local processor.

Configuration registers 204 provide status and error information to the local processor. The registers are also used by the local processor to assign an address range for this device to which to respond on the local bus. Each device on the bus must have a unique address range assigned for communication.

The present invention is believed to be applicable to a variety of applications that require interprocessor communication. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. An optical-interconnect node, comprising:
    an optical combiner having first and second optical input ports and an optical output port;
    an optical splitter having an input port and first and second output ports;
    a demultiplexer having an optical input port coupled to the second output port of the splitter and a plurality of electrical output ports for electrical signals that correspond to respective optical wavelengths presented at the input port; and
    a transmitter circuit having an electrical input port and an optical output port coupled to the second input port of the optical combiner.

2. The node of claim 1, wherein an optical signal of a single wavelength is output from the transmitter circuit to the combiner.

3. The node of claim 1, further comprising a bridge circuit configured and arranged to translate electrical signals between a first protocol and an second protocol, wherein the plurality of electrical output ports of the demultiplexer are coupled to the bridge circuit, and the electrical input port of the transmitter circuit is coupled to the bridge.

4. The node of claim 3, wherein the second protocol is a bus protocol.

5. The node of claim 4, wherein the bus protocol is a PCI bus.

6. The node of claim 3, wherein the bridge circuit further comprises:
    a serial-to-parallel converter having input ports coupled to output ports of the demultiplexer;
    a parallel-to-serial converter having an output port coupled to the transmitter circuit; and
    a programmable logic device coupled to the serial-to-parallel converter and to the parallel-to-serial converter, the programmable logic device configured and arranged to translate electrical signals between the first and second protocols.

7. The node of claim 6, wherein the programmable logic device is a field programmable logic device.

8. The node of claim 1, wherein the combiner and splitter are single mode fiber optic couplers.

9. A multi-node system having an optical-interconnect, comprising:
    a plurality of nodes, each node including a bus and having a processor and optical-interconnect circuitry coupled to the bus, wherein the optical interconnect circuitry includes
        a bridge circuit coupled to the bus and configured to translate electrical signals between a bus protocol and an interconnect protocol;
        a transmitter circuit having an electrical input port coupled to the bridge circuit and an optical output port;
        a demultiplexer having an optical input port and a plurality of electrical output ports coupled to the bridge circuit for electrical signals that correspond to respective optical wavelengths presented at the input port;
        an optical combiner having first and second optical input ports and an optical output port, wherein the second input port is coupled to the output port of the transmitter circuit, and the output port is coupled to the input port of a combiner of another node; and
        an optical splitter having an input port and first and second output ports, wherein the first output port is coupled to the demultiplexer, and the second output port is coupled to the input port of an optical splitter of another node;
    wherein in at least one of the nodes the output port of a combiner is coupled to the input port of the splitter.

10. The system of claim 9, wherein the transmitters in each of the nodes transmit light of a unique wavelength.

11. The system of claim 9, further comprising an optical amplifier having an input port coupled to the output port of the combiner of the one of the nodes and an output port coupled to the input port of the splitter of the one of the nodes.

12. The system of claim 9, wherein each node further includes a bridge circuit configured and arranged to translate electrical signals between a first protocol and an second protocol, wherein the plurality of electrical output ports of the demultiplexer are coupled to the bridge circuit, and the electrical input port of the transmitter circuit is coupled to the bridge.

13. The system of claim 12, wherein the second protocol is a bus protocol.

14. The system of claim 13, wherein the bus protocol is a PCI bus.

15. The system of claim 12, wherein the bridge circuit further comprises:
    a serial-to-parallel converter having input ports coupled to output ports of the demultiplexer;
    a parallel-to-serial converter having an output port coupled to the transmitter circuit; and
    a programmable logic device coupled to the serial-to-parallel converter and to the parallel-to-serial converter, the programmable logic device configured and arranged to translate electrical signals between the first and second protocols.

16. The system of claim 15, wherein the programmable logic device is a field programmable logic device.

17. The system of claim 9, wherein the combiner and splitter are single mode fiber optic couplers.

18. A method for communication between a plurality of nodes with an optical-interconnect, comprising:
- in transmitting from each node,
  - generating an electrical signal;
  - translating the electrical signal into an optical signal having a wavelength associated with the node;
  - combining the optical signal with optical signals from other ones of the nodes and transmitting the optical signals over a shared waveguide;
- in receiving at each node,
  - demultiplexing the optical signals from the shared waveguide into optical signals; and
  - translating the optical signals into respective electrical signals.

19. An apparatus for communication between a plurality of nodes with an optical-interconnect, comprising:
- means for generating an electrical signal in each of the nodes;
- means for translating the electrical signal into an optical signal having a wavelength associated with the node;
- means for combining the optical signal with optical signals from other ones of the nodes and transmitting the optical signals over a shared waveguide;
- means for demultiplexing the optical signals from the shared waveguide into optical signals in each of the nodes; and
- means for translating the optical signals into respective electrical signals in each of the nodes.

* * * * *